US012731899B2

(12) United States Patent
Shi

(10) Patent No.: US 12,731,899 B2
(45) Date of Patent: Sep. 8, 2026

(54) ANTENNA STRUCTURE AND WEARABLE ELECTRONIC DEVICE

(71) Applicant: GUANGDONG COROS SPORTS TECHNOLOGY CO., LTD, Dongguan City (CN)

(72) Inventor: Xianwei Shi, Dongguan City (CN)

(73) Assignee: GUANGDONG COROS SPORTS TECHNOLOGY CO., LTD, Dongguan City (CN)

( * ) Notice: Subject to any disclaimer, the term of this patent is extended or adjusted under 35 U.S.C. 154(b) by 49 days.

(21) Appl. No.: 18/762,191

(22) Filed: Jul. 2, 2024

(65) Prior Publication Data

US 2025/0015501 A1 Jan. 9, 2025

(30) Foreign Application Priority Data

Jul. 5, 2023 (CN) ........................ 202310822979.X

(51) Int. Cl.

*H01Q 9/04* (2006.01)
*G04G 17/04* (2006.01)
*H01Q 1/27* (2006.01)
*H01Q 5/371* (2015.01)

(52) U.S. Cl.

CPC ........... *H01Q 9/0421* (2013.01); *G04G 17/04* (2013.01); *H01Q 1/273* (2013.01); *H01Q 5/371* (2015.01)

(58) Field of Classification Search

CPC ...... H01Q 9/0421; H01Q 1/273; H01Q 5/371; H01Q 5/364; H01Q 13/10; H01Q 1/50; H01Q 1/12; H01Q 1/36; H01Q 1/48; H01Q 5/30; G04G 17/04

See application file for complete search history.

(56) References Cited

U.S. PATENT DOCUMENTS 10,871,751 B2 * 12/2020 Yun ........................ G04R 60/08
2014/0062801 A1 * 3/2014 Yong ........................ H01Q 1/42
343/702

(Continued)

FOREIGN PATENT DOCUMENTS

CN 220341506 U 1/2024
WO 2022111061 A1 6/2022

OTHER PUBLICATIONS

Extended European Search Report corresponding to EP Application No. 24186775.3; Mailing Date, Nov. 22, 2024, 12 pages.

*Primary Examiner* — Dameon E Levi
*Assistant Examiner* — Jordan E. DeWitt
(74) *Attorney, Agent, or Firm* — The Webb Law Firm

(57) ABSTRACT

An antenna structure and a wearable electronic device. The antenna structure includes a ring radiator provided with a feeding point, a first grounding point and a second grounding point, the feeding point is used for an electrical connection to a location determination element, and the first grounding point and the second grounding point are used for grounding respectively; a first antenna configured to receive a first satellite positioning signal of a first frequency, the first antenna includes a radiator between the feeding point and the first grounding point; and a second antenna configured to receive a second satellite positioning signal of a second frequency, the second antenna includes a radiator between the first grounding point and the second grounding point.

18 Claims, 8 Drawing Sheets

(56) References Cited

U.S. PATENT DOCUMENTS

| | | | | |
|---|---|---|---|---|
| 2015/0084817 | A1* | 3/2015 | Yong | H01Q 5/335<br>343/702 |
| 2016/0104935 | A1* | 4/2016 | Hung | H01Q 21/30<br>343/845 |
| 2019/0245271 | A1* | 8/2019 | Varjonen | H01Q 1/42 |
| 2022/0413163 | A1 | 12/2022 | Sayem et al. | |
| 2023/0231311 | A1* | 7/2023 | Zhao | G04R 60/00<br>343/702 |
| 2025/0015501 | A1* | 1/2025 | Shi | H01Q 5/371 |
| 2025/0112361 | A1* | 4/2025 | Shi | H01Q 1/273 |
| 2025/0279584 | A1* | 9/2025 | Shi | H01Q 1/22 |
| 2025/0293425 | A1* | 9/2025 | Shi | H01Q 9/30 |
| 2025/0293432 | A1* | 9/2025 | Shi | H01Q 5/10 |
| 2025/0385425 | A1* | 12/2025 | Wu | H01Q 1/273 |
| 2026/0011923 | A1* | 1/2026 | Zhu | H01Q 1/38 |
| 2026/0074429 | A1* | 3/2026 | Ren | H01Q 13/10 |

* cited by examiner

ANTENNA STRUCTURE AND WEARABLE ELECTRONIC DEVICE

CROSS-REFERENCE TO RELATED APPLICATION

Pursuant to 35 U.S.C. § 119 and the Paris Convention, this application claims the benefit of Chinese Patent Application No. 202310822979.X filed on Jul. 5, 2023, the content of which is incorporated herein by reference.

TECHNICAL FIELD

The present application relates to the field of antenna technology, and in particular, to an antenna structure and a wearable electronic device.

BACKGROUND

The statements provided herein are merely background information related to the present application, and do not necessarily constitute any prior arts. Wearable electronic devices are electronic devices worn on the human body. Wearable devices, especially smart watches, are usually used for activities such as walking, running, off-roading, cycling, rock climbing and mountain climbing. Wearable electronic devices usually include an antenna, a location determination element and a screen. The antenna receives one or more location signals, such as location signals based on the global navigation satellite system (Global Navigation Satellite System, GNSS), and transmits the received location signals to the location determination element. The location determination element processes the location signals to determine a geographic location of the electronic device. The screen is capable of displaying information on a user interface presented to the user, such as the determined geographic location on a map. In practical use scenarios, the wearable electronic devices need to have good performance in receiving satellite signals to achieve accurate positioning.

In the existing technologies, a metal ring mounted on a smart watch is generally used as a radiator of the smart watch, and the radiator has a feeding point and two grounding points on both sides of the feeding point. Portions of the radiator located respectively between the feeding point and the two grounding points are utilized to receive signals in L1 (frequency band of 1.6 GHz) band and L5 (frequency band of 1.2 GHz) band respectively. However, the above technical scheme has the following problem: as an optimal layout of the feeding point should be at the 2-4 o'clock position of the smart watch to ensure the right-hand gain of the L1 and L5 frequency bands toward the sky, while this position is generally a location of a button module of the watch, thus a clearance space of the feeding point cannot be effectively guaranteed, and the practical engineering implementation is difficult.

SUMMARY

Embodiments of the present application provides an antenna structure and a wearable electronic device, which can solve the technical problem in the existing technologies that the antenna structure and the wearable electronic device are difficult to manufacture as the portions of the radiator located between the feeding point and the two grounding points are utilized to receive the signals in the L1 frequency band and the L5 frequency band.

In accordance with a first aspect, an embodiment of the present application provides an antenna structure, including a ring radiator, a first antenna and a second antenna. The ring radiator is provided with a feeding point, a first grounding point and a second grounding point, the feeding point is used for an electrical connection to a location determination element, and the first grounding point and the second grounding point are used for grounding respectively;

The first antenna is configured to receive a first satellite positioning signal of a first frequency, the first antenna includes a first radiator between the feeding point and the first grounding point;

The second antenna is configured to receive a second satellite positioning signal of a second frequency, the second antenna includes a second radiator between the first grounding point and the second grounding point.

In a possible implementation, the first radiator is electrically coupled to the feeding point; and the second radiator is electrically coupled to the feeding point.

In a possible implementation, the feeding point, the first grounding point and the second grounding point are sequentially arranged at intervals in a counterclockwise direction along a circumference of the ring radiator.

In a possible implementation, an equivalent length of the first antenna is ½ of a wavelength of L1 frequency band, and an equivalent length of the second antenna is ½ of a wavelength of L5 frequency band.

In a possible implementation, the second antenna is also configured to receive WIFI/BT signals.

In a possible implementation, the equivalent length of the first antenna is ½ of the wavelength of the L5 frequency band, and the equivalent length of the second antenna is ½ of the wavelength of the L1 frequency band.

In a possible implementation, the first antenna is also configured to receive WIFI/BT signals.

In a possible implementation, the feeding point, the first grounding point and the second grounding point are sequentially arranged at intervals in a clockwise direction along the circumference of the ring radiator.

In a possible implementation, the equivalent length of the first antenna is ½ of the wavelength of the L1 frequency band, and the equivalent length of the second antenna is ½ of the wavelength of the L5 frequency band.

In a possible implementation, the second antenna is also configured to receive WIFI/BT signals.

In a possible implementation, the equivalent length of the first antenna is ½ of the wavelength of the L5 frequency band, and the equivalent length of the second antenna is ½ of the wavelength of the L1 frequency band.

In a possible implementation, the first antenna is also configured to receive WIFI/BT signals.

In a possible implementation, the ring radiator is also provided with a third grounding point, the third grounding point is arranged at a position close to the feeding point.

In a possible implementation, the ring radiator is at least partially composed of a conductive material.

In a possible implementation, the antenna structure also includes a first frequency tuning element. The first frequency tuning element is selectable and in electrical connection with the first antenna and is configured to adjust a resonant frequency of the first antenna.

In a possible implementation, the antenna structure also includes a second frequency tuning element. The second frequency tuning element is selectable and in electrical connection with the second antenna and is configured to adjust the resonant frequency of the second antenna.

In accordance with a second aspect, an embodiment of the present application provides a wearable electronic device, including a housing, a location determination element, and the antenna structure as described in any one of the first aspect or the second aspect, where the housing has a bottom wall and a side wall connected to the bottom wall, and the antenna structure is arranged on the side wall.

Where, the location determination element is electrically coupled to the first antenna and the second antenna, respectively, and is configured to receive a first satellite positioning signal and a second satellite positioning signal and determine a current geographical location according to the first satellite positioning signal and the second satellite positioning signal.

Compared with the existing technologies, the embodiments of the present application have the following beneficial effects:

The antenna structure provided in the embodiment of the present application includes a ring radiator, where a feeding point, a first grounding point and a second grounding point are arranged on the ring radiator, the feeding point is used for an electrical connection to a location determination element, and the first grounding point and the second grounding point are used for grounding respectively. The arrangement of the feeding point, the first grounding point and the second grounding point enables the ring radiator to form a first antenna and a second antenna. The first antenna includes a radiator between the feeding point and the first grounding point, and the second antenna includes a radiator between the first grounding point and the second grounding point. The first antenna can receive a first satellite positioning signal of a first frequency, and the second antenna can receive a second satellite positioning signal of a second frequency. Thus, the feeding point can be arranged at a position other than 2-4 points of the smart watch on the premise of improving the right-hand gain of the antenna structure in the direction toward the sky, so that the clearance space of the feeding point can be effectively guaranteed, and the difficulty of manufacturing the antenna structure and the wearable electronic device can be reduced.

It can be understood that, for beneficial effects of the second aspect mentioned above, references may be made to relevant descriptions in the first aspect as mentioned above, which will not be repeated here.

BRIEF DESCRIPTION OF DRAWINGS

In order to illustrate the technical solutions in the embodiments of the present application more clearly, the drawings that need to be used in the description of the embodiments will be briefly introduced below. Obviously, the drawings in the following description are merely some embodiments of the present application. For persons of ordinary skill in the art, other drawings may also be obtained based on these drawings without exerting creative efforts.

Figure 1:
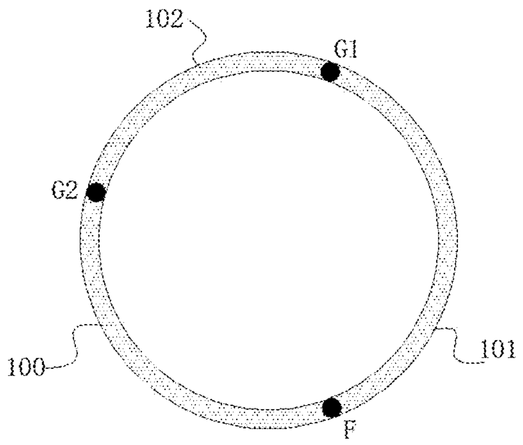
FIG. 1 is a schematic diagram of an antenna structure provided by an embodiment of the present application.

In the FIGURES, the main reference symbols are listed as follows: 100, ring radiator; 101, first antenna; 102, second antenna; and 200, housing.

DETAILED DESCRIPTION OF EMBODIMENTS

In the following description, for the purpose of explanation rather than limitation, particular details such as specific system structures and technologies are presented so as to thoroughly understand the embodiments of the present application. However, it should be clear to persons skilled in the art that the present application may also be implemented in other embodiments without these specific details. In other cases, detailed descriptions of well-known systems, devices, circuits and methods are omitted to avoid unnecessary details that hinder the description of the present application.

It should be understood that, when used in this disclosure and the appended claims of the present application, the term "including" indicates the presence of the described features, wholes, steps, operations, elements and/or components, but does not exclude the presence or addition of one or more other features, wholes, steps, operations, elements, components and/or the combination thereof.

It should also be understood that the term "and/or" used in this disclosure and the appended claims of the present application refers to any combination of one or more of the associated listed items and all possible combinations thereof, and includes these combinations.

As used in this disclosure and the appended claims of the present application, the term "if" can be interpreted as "when . . . " or "once" or "in response to a determination" or "in response to a detection" according to the context. Similarly, the phrase "if determined" or "if [described condition or event] is detected" may be interpreted, depending on the context, to mean "once determined" or "in response to determining" or "once [described condition or event] is detected" or "in response to detecting [described condition or event]."

In addition, in the description of this disclosure and the appended claims of the present application, the terms "first", "second", "third", etc. are intended only to distinguish the description and are not to be construed as indicating or implying relative importance.

The reference to "one embodiment" or "some embodiments" described in this disclosure of the present application means that one or more embodiments of the present application include specific features, structures or characteristics described in conjunction with the embodiment. Therefore, the statements "in one embodiment", "in some embodiments", "in other embodiments", "in some other embodiments", etc. appearing in different places in the present specification do not necessarily refer to the same embodiment, but mean "one or more but not all embodiments", unless otherwise specifically emphasized. The terms "including", "comprising", "having" and their variations all mean "including but not limited to", unless otherwise specifically emphasized.

The antenna structure on a traditional smart watch includes two antennas, and the two antennas share one feeding point, that is, the two antennas are distributed on both sides of the feeding point, one antenna is configured to receive a positioning signal of L1 frequency band (1.6 GHz), and the other antenna is configured to receive a positioning signal of L5 frequency band (1.2 GHz). In order to ensure the right-hand gain of the signals in the L1 frequency band and the L5 frequency band toward the sky received by the antenna structure, it is required to arrange the feeding point at the position of 2-4 o'clock on the smart watch, while the position of 2-4 o'clock on the smart watch is the position of the button module, which results in that the clearance space of the feeding point cannot be effectively guaranteed.

In view of the above problem, an embodiment of the present application provides an antenna structure, as shown in FIG. 1, the antenna structure includes a ring radiator 100, and the ring radiator 100 is provided with a feeding point F, a first grounding point G1 and a second grounding point G2, the feeding point F is used for an electrical connection to a location determination element, and the first grounding point G1 and the second grounding point G2 are used for grounding respectively. The first antenna 101 is configured to receive a first satellite positioning signal of a first frequency, and the first antenna 101 includes a radiator between the feed point F and the first ground point G1. The second antenna 102 is configured to receive a second satellite positioning signal of a second frequency, and the second antenna 102 includes a radiator between the first ground point G1 and the second ground point G2. The frequency band of the first antenna 101 is different from that of the second antenna 102.

Particularly, the feed point F, the first ground point G1 and the second ground point G2 are arranged on the ring radiator 100, which enables the ring radiator 100 to form the first antenna 101 and the second antenna 102. The first antenna 101 includes the radiator between the feed point F and the first ground point G1, and the second antenna 102 includes the radiator between the first ground point G1 and the second ground point G2. The first antenna 101 can receive the first satellite positioning signal of the first frequency. In addition, a half-wave slot mode of the radiator between the first ground point G1 and the second ground point G2 is excited by the feed point F and a traveling wave mode of the radiator between the feed point F and the first ground point G1, so that the second antenna 102 is enabled to receive the second satellite positioning signal of the second frequency. Thus, in the antenna structure provided by the embodiment of the present application, the first antenna 101 can receive the first satellite positioning signal of the first frequency, and the second antenna 102 can receive the second satellite positioning signal of the second frequency, so that the feed point F can be arranged at a position other than 2-4 points of the smart watch under the premise of improving the right-hand gain of the antenna structure facing the sky, such that the clearance space of the feeding point F can be effectively guaranteed, and the difficulty of manufacturing the antenna structure and the wearable electronic device can be reduced.

It should be noted that the designer can layout the specific positions of the feeding point F, the first grounding point G1 and the second grounding point G2 according to actual conditions. The designer may also design equivalent lengths of the first antenna 101 and the second antenna 102 according to actual conditions, so that the first antenna 101 can receive the first satellite positioning signal of the first frequency, and the second antenna 102 can receive the second satellite positioning signal of the second frequency.

In some embodiments, as shown in FIG. 1, the feed point F, the first ground point G1, and the second ground point G2 are sequentially arranged at intervals in a counterclockwise direction along the circumference of the ring radiator 100. The equivalent length of the first antenna 101 is ½ of the wavelength of the L1 frequency band, and the equivalent length of the second antenna 102 is ½ of the wavelength of the L5 frequency band.

Particularly, the equivalent length of the first antenna 101 is set to ½ of the wavelength of the L1 frequency band, which enables the first antenna 101 to receive signals in the L1 frequency band (1.6 GHz). The equivalent length of the second antenna 102 is set to ½ of the wavelength of the L5 frequency band, which enables the second antenna 102 to receive signals in the L5 frequency band (1.2 GHz).

Figure 2:
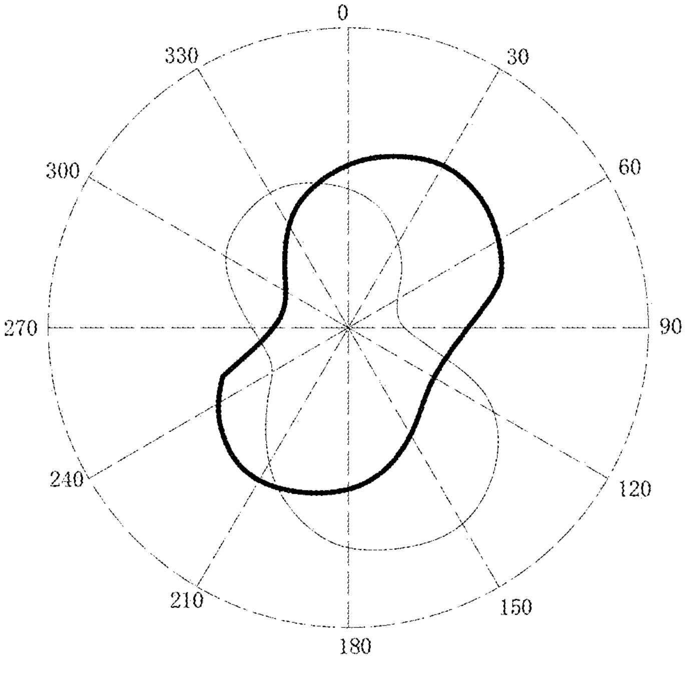
FIG. 2 is a gain diagram of the antenna structure shown in FIG. 1 receiving signals in L5 frequency band.
Figure 3:
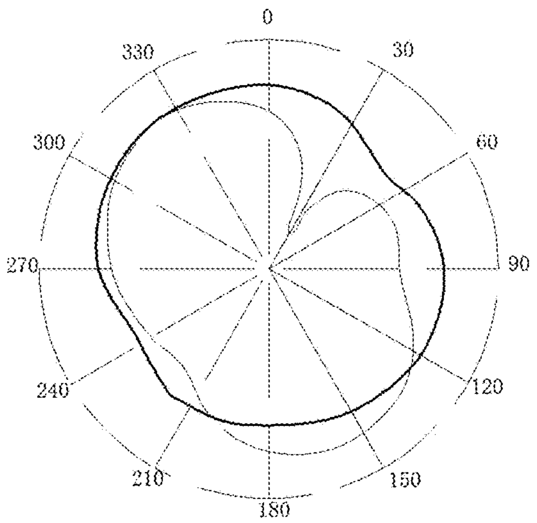
FIG. 3 is a gain diagram of the antenna structure shown in FIG. 1 receiving signals in L1 frequency band.

In the antenna structure shown in FIG. 1, the feed point F is arranged at the 5 o'clock position on the ring radiator 100. As shown in FIG. 2, the antenna structure, when receiving the signals in the L5 frequency band, has good right-hand gain at 0°-60° and 180°-240°. The bold solid line in FIG. 2 represents the right-hand gain of the antenna structure, and the thin solid line represents the left-hand gain of the antenna structure. As shown in FIG. 3, the antenna structure, when receiving the signals in the L1 frequency band, has good right-hand gain at 0°-120° and 210°-360°. The bold solid line in FIG. 3 represents the right-hand gain of the antenna structure, and the thin solid line represents the left-hand gain of the antenna structure.

Figure 4:
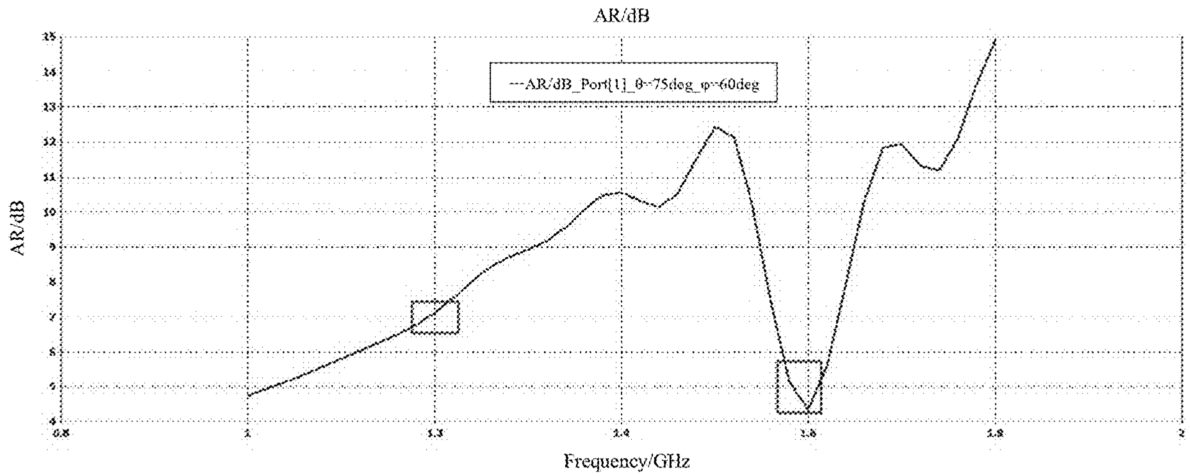
FIG. 4 is an axial ratio diagram of the antenna structure shown in FIG. 1.

As shown in FIG. 4, for the antenna structure having the feed point F being arranged at the 5 o'clock position on the ring radiator 100. At 1.2 GHz, the axial ratio of the antenna structure is about 7 dB, and at 1.6 GHz, the axial ratio of the antenna structure is about 4 dB. The axial ratio characteristics of the antenna structure are good at 1.2 GHz and 1.6 GHz, and the antenna structure can well receive the signals in L1 frequency band and the signals in L5 frequency band.

Based on the principle of frequency doubling, the second antenna 102 may also be enabled to receive signals of 2.4 GHz, and in the case, the second antenna 102 can receive WIFI/BT signals (i.e., WIFI signals or Bluetooth signals). Thereby, the antenna structure provided in the embodiment of the present application can receive the signals in L1 frequency band, the signals in L5 frequency band and the WIFI/BT signals.

Figure 5:
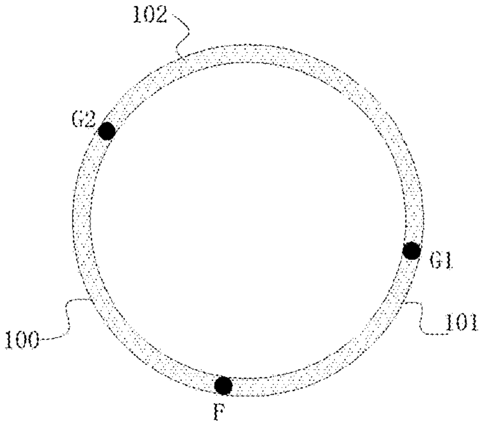
FIG. 5 is a schematic diagram of an antenna structure provided by another embodiment of the present application.

In some embodiments, as shown in FIG. 5, the equivalent length of the first antenna 101 may also be set to ½ of the wavelength of the L5 frequency band, and the equivalent length of the second antenna 102 may be set to ½ of the wavelength of the L1 frequency band.

Particularly, the equivalent length of the first antenna 101 is set to ½ of the wavelength of the L5 frequency band, which enables the first antenna 101 to receive signals in the L5 frequency band. The equivalent length of the second antenna 102 is set to ½ of the wavelength of the L1 frequency band, which enables the second antenna 102 to receive signals in the L1 frequency band.

Figure 6:
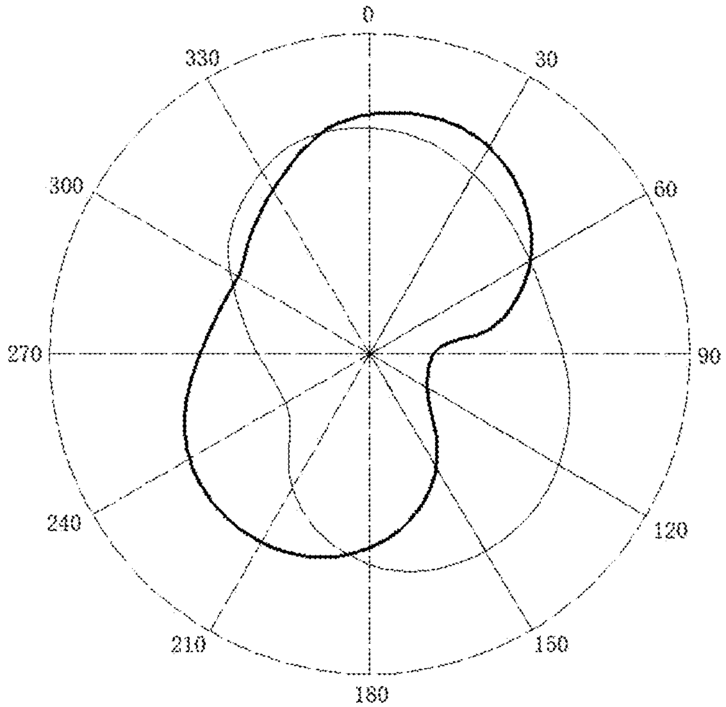
FIG. 6 is a gain diagram of the antenna structure shown in FIG. 5 receiving signals in L5 frequency band.
Figure 7:
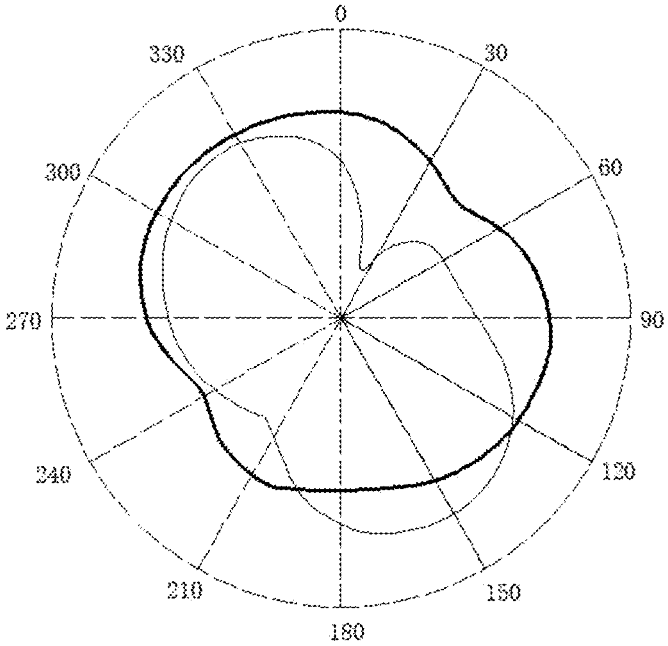
FIG. 7 is a gain diagram of the antenna structure shown in FIG. 5 receiving signals in L1 frequency band.

In the antenna structure shown in FIG. 5, the feed point F is arranged at the 6 o'clock position on the ring radiator 100. As shown in FIG. 6, the antenna structure, when receiving the signals in the L5 frequency band, has good right-hand gain at 0°-60° and 180°-240°. The bold solid line in FIG. 6 represents the right-hand gain of the antenna structure, and the thin solid line represents the left-hand gain of the antenna structure. As shown in FIG. 7, the antenna structure, when receiving the signals in the L1 frequency band, has good right-hand gain at 0°-120° and 210°-360°. The bold solid line in FIG. 7 represents the right-hand gain of the antenna structure, and the thin solid line represents the left-hand gain of the antenna structure.

Based on the principle of frequency doubling, the first antenna 101 may also be enabled to receive frequency doubled signals of L5. Since the signals in L5 are of 1.2 GHz, the first antenna 101 may also be able to receive signals of 2.4 GHz, that is, the first antenna 101 can receive WIFI/BT signals (i.e., WIFI signals or Bluetooth signals). Thus, the antenna structure provided in the embodiment of the present application can receive the signals in L1 frequency band, the signals in L5 frequency band and the WIFI/BT signals.

Figure 8:
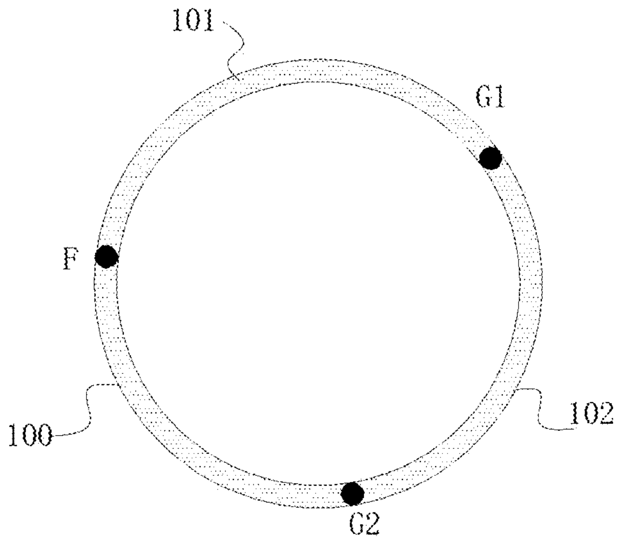
FIG. 8 is a schematic diagram of an antenna structure provided by another embodiment of the present application.

In some embodiments, as shown in FIG. 8, the feed point F, the first grounding point G1 and the second grounding point G2 are sequentially arranged at intervals in a clockwise direction along the circumference of the ring radiator 100. The equivalent length of the first antenna 101 may be set to ½ of the wavelength of the L1 frequency band, and the equivalent length of the second antenna 102 may be set to ½ of the wavelength of the L5 frequency band.

Particularly, the equivalent length of the first antenna 101 is set to ½ of the wavelength of the L1 frequency band, which enables the first antenna 101 to receive signals in the L1 frequency band (1.6 GHz). The equivalent length of the second antenna 102 is set to ½ of the wavelength of the L5 frequency band, which enables the second antenna 102 to receive signals in the L5 frequency band (1.2 GHz).

Figure 9:
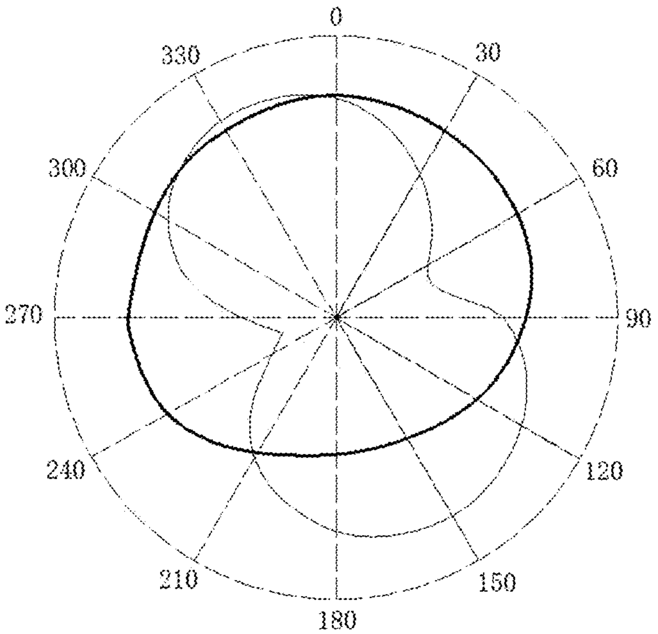
FIG. 9 is a gain diagram of the antenna structure shown in FIG. 8 receiving signals in L5 frequency band.
Figure 10:
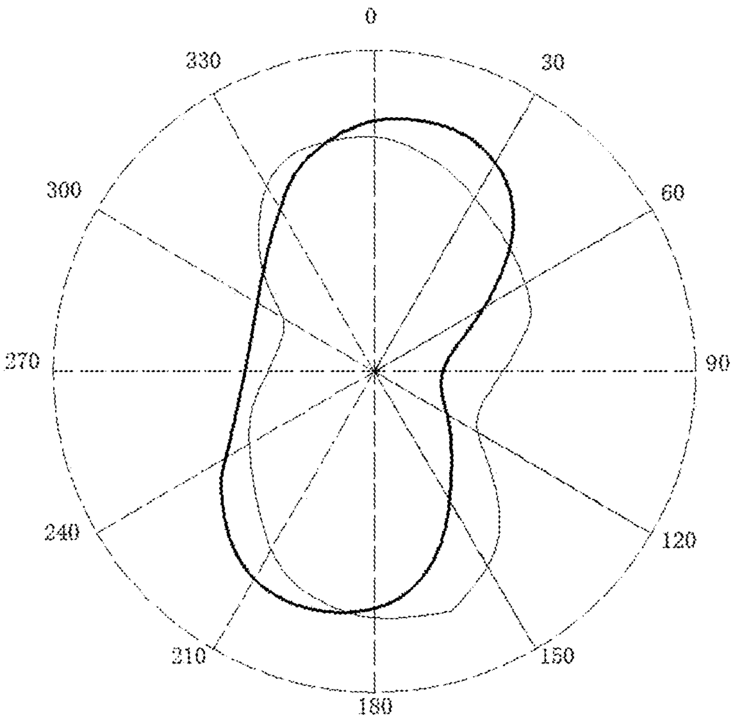
FIG. 10 is a gain diagram of the antenna structure shown in FIG. 8 receiving signals in L1 frequency band.

In the antenna structure shown in FIG. 8, the feed point F is arranged at the 9 o'clock position on the ring radiator 100. As shown in FIG. 9, the antenna structure, when receiving the signals in the L5 frequency band, has good right-hand gain at 0°-90° and 210°-300°. The bold solid line in FIG. 9 represents the right-hand gain of the antenna structure, and the thin solid line represents the left-hand gain of the antenna structure. As shown in FIG. 10, the antenna structure, when receiving the signals in the L1 frequency band, has good right-hand gain at 0°-50° and 190°-310°. The bold solid line in FIG. 10 represents the right-hand gain of the antenna structure, and the thin solid line represents the left-hand gain of the antenna structure.

Based on the principle of frequency doubling, the second antenna 102 may also be enabled to receive signals of 2.4 GHz, and in this case, the second antenna 102 can receive WIFI/BT signals (WIFI signals or Bluetooth signals). Thereby, the antenna structure provided in the embodiment of the present application can receive the signals in L1 frequency band, the signals in L5 frequency band, and the WIFI/BT signals.

Figure 11:
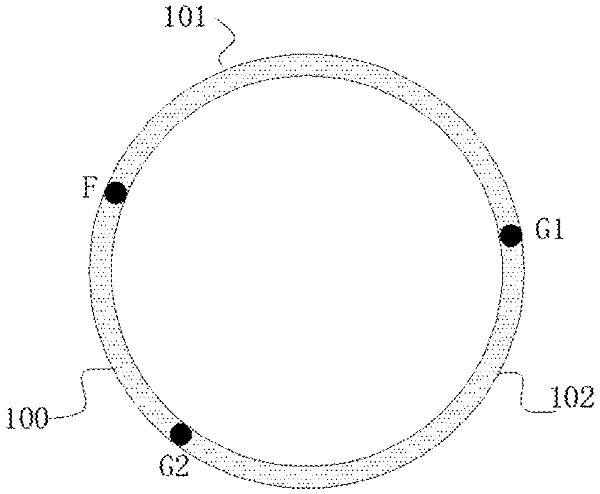
FIG. 11 is a schematic diagram of an antenna structure provided by another embodiment of the present application.

In some embodiments, as shown in FIG. 11, the equivalent length of the first antenna 101 may also be set to ½ of the wavelength of the L5 frequency band, and the equivalent length of the second antenna 102 may be set to ½ of the wavelength of the L1 frequency band.

Particularly, the equivalent length of the first antenna 101 is set to ½ of the wavelength of the L5 frequency band, which enables the first antenna 101 to receive signals in the L5 frequency band. The equivalent length of the second antenna 102 is set to ½ of the wavelength of the L1 frequency band, which enables the second antenna 102 to receive signals in the L1 frequency band.

Figure 12:
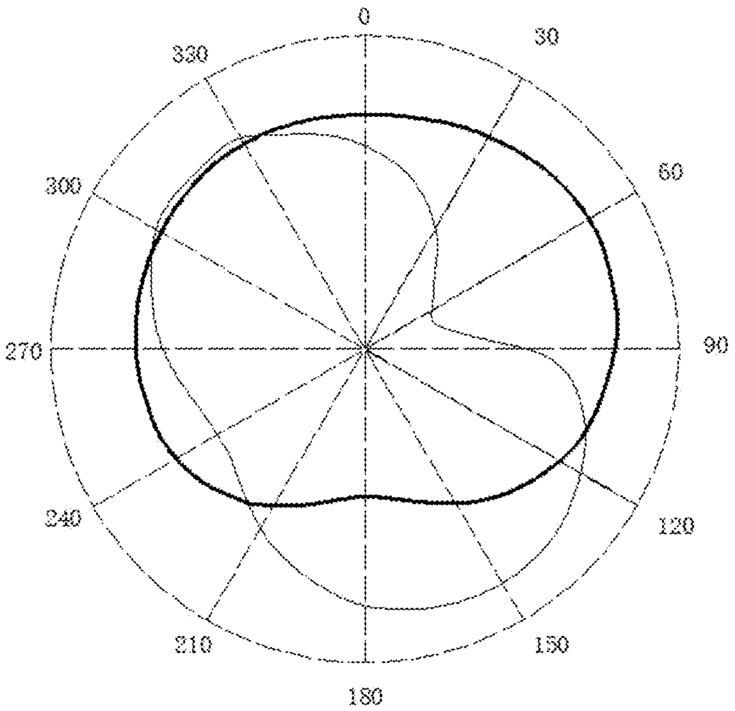
FIG. 12 is a gain diagram of the antenna structure shown in FIG. 11 receiving signals in L5 frequency band.
Figure 13:
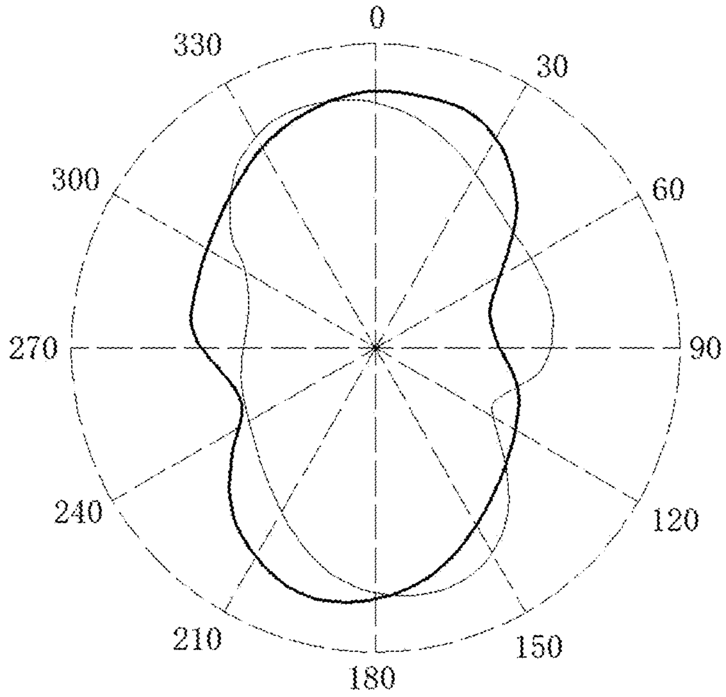
FIG. 13 is a gain diagram of the antenna structure shown in FIG. 11 receiving signals in L1 frequency band.

In the antenna structure shown in FIG. 11, the feed point F is arranged at the 9 o'clock position on the ring radiator 100. As shown in FIG. 12, the antenna structure, when receiving the signals in the L5 frequency band, has good right-hand gain at 0°-110°, 220°-300°, and 330°-360°. The bold solid line in FIG. 12 represents the right-hand gain of the antenna structure, and the thin solid line represents the left-hand gain of the antenna structure. As shown in FIG. 13, the antenna structure, when receiving the signals in the L1 frequency band, has good right-hand gain at 0°-50°, 180°-320°, and 330°-360°. The bold solid line in FIG. 13 represents the right-hand gain of the antenna structure, and the thin solid line represents the left-hand gain of the antenna structure.

Based on the principle of frequency doubling, the first antenna 101 may also be enabled to receive the frequency doubled signals of L5. Since signals in L5 are of 1.2 GHz, the first antenna 101 is also enabled to receive signals of 2.4 GHz, that is, the first antenna 101 can receive WIFI/BT signals (WIFI signals or Bluetooth signals). Thus, the antenna structure provided in the embodiment of the present application can receive the signals in L1 frequency band, the signals in L5 frequency band and the WIFI/BT signals.

Figure 14:
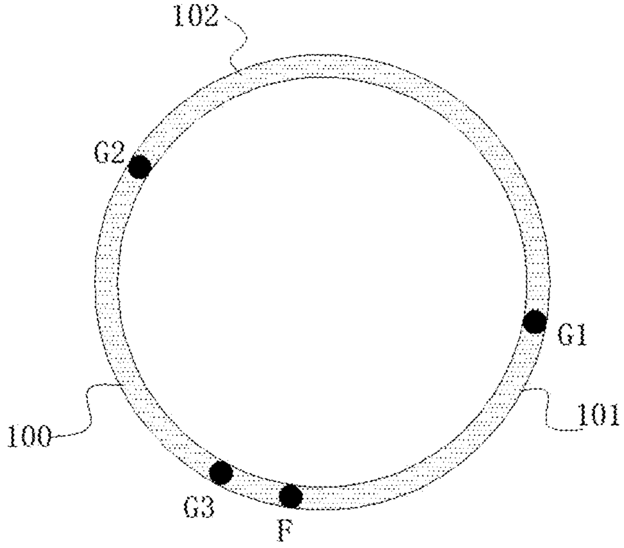
FIG. 14 is a schematic diagram of an antenna structure provided by another embodiment of the present application.

In some embodiments, as shown in FIG. 14, a third grounding point G3 is further provided on the ring radiator 100, and the third grounding point G3 is arranged at a position close to the feeding point F, and the third grounding point G3 is used for grounding. The third grounding point G3 is utilized to improve the impedance matching at the position of the feeding point F.

In some embodiments, the ring radiator 100 is at least partially composed of a conductive material.

Figure 15:
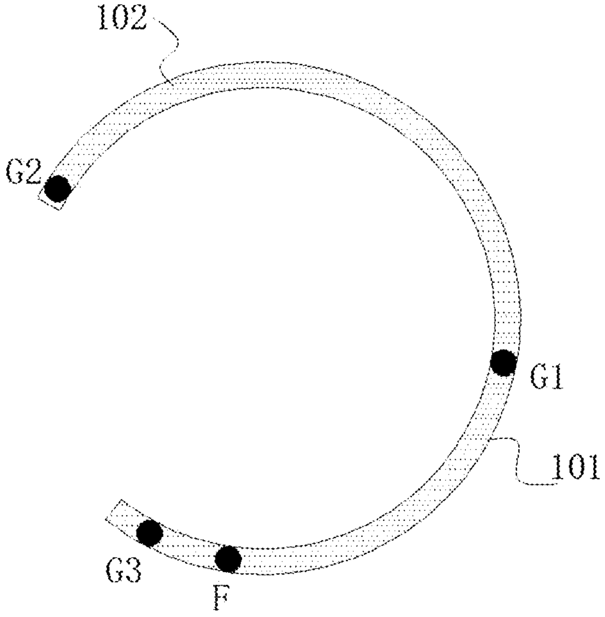
FIG. 15 is a schematic diagram of an antenna structure provided by another embodiment of the present application.

Particularly, the designer may design the ring radiator 100 as a complete circular radiator (for example, as shown in FIG. 1, FIG. 5, FIG. 8, FIG. 11 and FIG. 14) according to actual conditions, or as a part of a complete circular radiator (for example, as shown in FIG. 15), but it is required to ensure that the radiator between the feeding point F and the first grounding point G1 and the radiator between the first grounding point G1 and the second grounding point G2 are both made of a conductive material. If the third grounding point G3 is provided on the ring radiator 100, then it is required to ensure that the radiator between the feeding point F and the third grounding point G3 is made of a conductive material. The conductive material may be a metal, a metal alloy or other conductive materials.

In one embodiment of the present application, the antenna structure also includes a first frequency tuning element. The first frequency tuning element is selectable and in electrical connection with the first antenna 101 and is configured to adjust a resonant frequency of the first antenna 101. The antenna structure also includes a second frequency tuning element. The second frequency tuning element is selectable and in electrical connection with the second antenna 102 and is configured to adjust a resonant frequency of the second antenna 102.

Particularly, the first frequency tuning element is used to adjust the resonant frequency of the first antenna 101 to enable the first antenna 101 to receive a signal of the first frequency. The second frequency tuning element is used to adjust the resonant frequency of the second antenna 102 to enable the second antenna 102 to receive a signal of the second frequency.

As shown in FIGS. 1 to 15, the present application also discloses an antenna structure, which includes a ring radiator 100, and on ring radiator 100, a feeding point F, a first grounding point G1 and a second grounding point G2 are provided, the feeding point F is used for an electrical connection to a location determination element, and the first grounding point G1 and the second grounding point G2 are used for grounding respectively. The first antenna 101 is configured to receive a first satellite positioning signal of a first frequency, the first antenna 101 includes a first radiator between the feeding point F and the first grounding point G1, and the first radiator is electrically coupled to the feeding point F. The second antenna 102 is configured to receive a second satellite positioning signal of a second frequency, the second antenna 102 includes a second radiator between the first grounding point G1 and the second grounding point G2, and the second radiator is electrically coupled to the feeding point F.

Particularly, the feeding point F, the first grounding point G1, and the second grounding point G2 are arranged on the ring radiator 100, which enables the ring radiator 100 to form the first antenna 101 and the second antenna 102. The first antenna 101 includes a radiator between the feeding point F and the first grounding point G1, and the second antenna 102 includes a radiator between the first grounding point G1 and the second grounding point G2. The first antenna 101 can receive the first satellite positioning signal of the first frequency. In addition, a half-wave slot mode of the radiator between the first grounding point G1 and the second grounding point G2 is excited by the feeding point F and a traveling wave mode of the radiator between the feeding point F and the first grounding point G1, so that the second antenna 102 can receive the second satellite positioning signal of the second frequency. As the first antenna 101 includes the first radiator between the feeding point F and the first grounding point G1, the first radiator is electrically coupled to the feeding point F, the second antenna 102 includes the second radiator between the first grounding point G1 and the second grounding point G2, and the second radiator is electrically coupled to the feeding point F. The first satellite positioning signal of the first frequency received by the first antenna 101 may be transmitted to the location determination element through the feeding point F, and the second satellite positioning signal of the second frequency received by the second antenna 102 may be transmitted to the location determination element through the feeding point F. Thus, in the antenna structure provided by the embodiment of the present application, the first antenna 101 can receive the first satellite positioning signal of the first frequency, and the second antenna 102 can receive the second satellite positioning signal of the second frequency, so that the feeding point F can be arranged at a position other than 2-4 points of the smart watch on the premise of improving the right-hand gain of the antenna structure facing the sky, such that the clearance space of the feeding point F can be effectively guaranteed, and the difficulty of manufacturing the antenna structure and the wearable electronic device can be reduced.

It should be noted that the designer may layout the specific positions of the feeding point F, the first grounding point G1 and the second grounding point G2 according to the actual situation, and the designer may also design the equivalent lengths of the first antenna 101 and the second antenna 102 according to the actual situation, so that the first antenna 101 can receive the first satellite positioning signal of the first frequency, and the second antenna 102 can receive the second satellite positioning signal of the second frequency.

Figure 16:
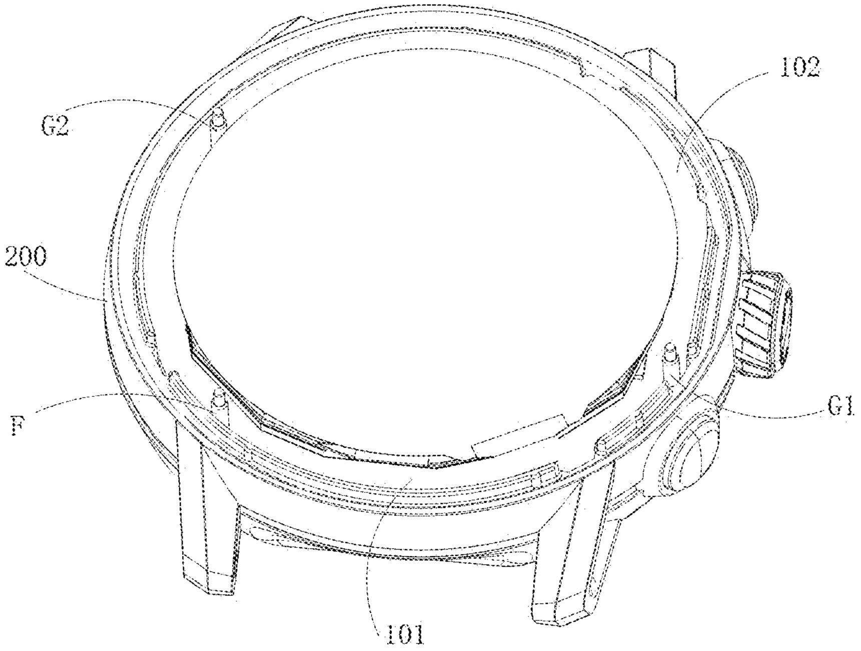
FIG. 16 is a schematic diagram of a wearable electronic device provided by an embodiment of the present application.
Figure 17:
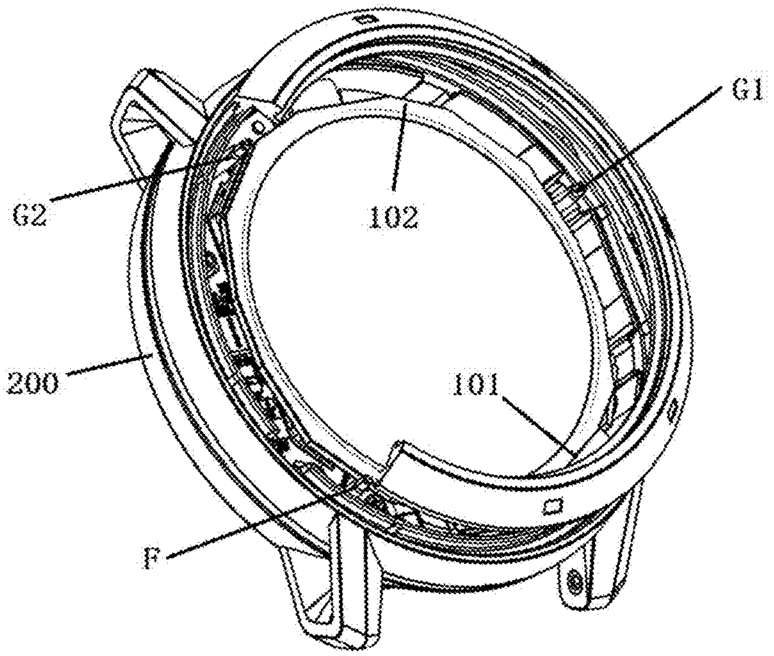
FIG. 17 is a schematic diagram of a wearable electronic device provided by another embodiment of the present application.

The present application also discloses a wearable electronic device, as shown in FIG. 16 and FIG. 17, the wearable electronic device includes a housing 200, a location determination element and the antenna structure as described above, the housing 200 includes a bottom wall and a side wall connected to the bottom wall, and the antenna structure is arranged on the side wall.

Particularly, the ring radiator may be arranged on an upper edge of the side wall, or on an inner wall of the side wall. The ring radiator is provided with the feeding point F, the first grounding point G1 and the second grounding point G2, the feeding point F is used for an electrical connection to the location determination element, and the first grounding point G1 and the second grounding point G2 are used for grounding respectively. The first antenna 101 is configured to receive the first satellite positioning signal of the first frequency, and the first antenna 101 includes the radiator between the feeding point F and the first grounding point G1. The second antenna 102 is configured to receive the second satellite positioning signal of the second frequency, and the second antenna 102 includes the radiator between the first grounding point G1 and the second grounding point G2.

The feeding point F, the first grounding point G1 and the second grounding point G2 are arranged on the ring radiator 100, which enables the ring radiator 100 to form the first antenna 101 and the second antenna 102. The first antenna 101 includes the radiator between the feeding point F and the first grounding point G1, and the second antenna 102 includes the radiator between the first grounding point G1 and the second grounding point G2. The first antenna 101 can receive the first satellite positioning signal of the first frequency. In addition, the half-wave slot mode of the radiator between the first grounding point G1 and the second grounding point G2 is excited by the feeding point F and the traveling wave mode of the radiator between the feeding point F and the first grounding point G1, so that the second antenna 102 can receive the second satellite positioning signal of the second frequency. Thus, in the antenna structure provided by the embodiment of the present application, the first antenna 101 can receive the first satellite positioning signal of the first frequency, and the second antenna 102 can receive the second satellite positioning signal of the second frequency, so that the feeding point F can be arranged at a position other than 2-4 points of the smart watch under the premise of improving the right-hand gain of the antenna structure, such that that the clearance space of the feeding point F can be effectively guaranteed, and the difficulty of manufacturing the antenna structure and the wearable electronic device can be reduced.

The location determination element is electrically coupled to the first antenna 101 and the second antenna 102 respectively, and is configured to receive the first satellite positioning signal and the second satellite positioning signal, and determine a current geographical location according to the first satellite positioning signal and the second satellite positioning signal to realize a function of positioning.

It should be noted that the wearable electronic device disclosed in the present application may be a watch, a bracelet or other wearable devices having the function of positioning.

The embodiments described above are used only to illustrate, rather than limiting, the technical solutions of the present application. Although the present application has been described in detail with reference to the aforementioned embodiments, a person skilled in the art should understand that the technical solutions described in the aforementioned embodiments may still be modified, or some of the technical features may be replaced by equivalents. Such modifications or replacements do not deviate the essence of the corresponding technical solutions from the spirit and scope of the technical solutions of the embodiments of the present application, and thus should all be included within the protection scope of the present application.

What is claimed is:

1. An antenna structure, comprising:

a ring radiator, provided with a feeding point, a first grounding point and a second grounding point, wherein the feeding point is used for an electrical connection to a location determination element, and the first grounding point and the second grounding point are used for grounding respectively;

a first antenna, comprising a first radiator between the feeding point and the first grounding point; and a second antenna, configured to receive a second satellite positioning signal of a second frequency, wherein the second antenna comprises a second radiator between the first grounding point and the second grounding point, wherein the first radiator is electrically coupled to the feeding point, and the second radiator is electrically coupled to the feeding point, wherein the feeding point, the first grounding point and the second grounding point are sequentially arranged at intervals on the ring radiator, and wherein the first antenna is configured to receive a first satellite positioning signal of a first frequency, and a half-wave slot mode of the second radiator between the first grounding point and the second grounding point is excited by the feeding point and a traveling wave mode of the first radiator between the feeding point and the first grounding point, to allow the second antenna to receive the second satellite positioning signal of the second frequency.

2. The antenna structure according to claim 1, wherein the feeding point, the first grounding point and the second grounding point are sequentially arranged at intervals in a counterclockwise direction along a circumference of the ring radiator.

3. The antenna structure according to claim 2, wherein an equivalent length of the first antenna is ½ of a wavelength of L1 frequency band, and an equivalent length of the second antenna is ½ of a wavelength of L5 frequency band.

4. The antenna structure according to claim 3, wherein the second antenna is further configured to receive WIFI/Bluetooth (WIFI/BT) signals.

5. The antenna structure according to claim 2, wherein an equivalent length of the first antenna is ½ of a wavelength of L5 frequency band, and an equivalent length of the second antenna is ½ of a wavelength of L1 frequency band.

6. The antenna structure according to claim 5, wherein the first antenna is further configured to receive WIFI/BT signals.

7. The antenna structure according to claim 1, wherein the feeding point, the first grounding point and the second grounding point are sequentially arranged at intervals in a clockwise direction along a circumference of the ring radiator.

8. The antenna structure according to claim 7, wherein an equivalent length of the first antenna is ½ of a wavelength of L1 frequency band, and an equivalent length of the second antenna is ½ of a wavelength of L5 frequency band.

9. The antenna structure according to claim 8, wherein the second antenna is further configured to receive WIFI/BT signals.

10. The antenna structure according to claim 7, wherein an equivalent length of the first antenna is ½ of a wavelength of L5 frequency band, and an equivalent length of the second antenna is ½ of a wavelength of L1 frequency band.

11. The antenna structure according to claim 10, wherein the first antenna is further configured to receive WIFI/BT signals.

12. The antenna structure according to claim 1, wherein the ring radiator is further provided with a third grounding point, the third grounding point is arranged a position close to the feeding point.

13. The antenna structure according to claim 1, wherein the ring radiator is at least partially composed of a conductive material.

14. The antenna structure according to claim 1, wherein the antenna structure further comprises a first frequency tuning element, the first frequency tuning element is selectable and in electrical connection with the first antenna and is configured to adjust a resonant frequency of the first antenna.

15. The antenna structure according to claim 14, wherein the antenna structure further comprises a second frequency tuning element, the second frequency tuning element is selectable and in electrical connection with the second antenna and is configured to adjust a resonant frequency of the second antenna.

16. A wearable electronic device, comprising:

a housing, comprising a bottom wall and a side wall connected to the bottom wall;

a location determination element; and an antenna structure, arranged on the side wall of the housing, and comprising:

a ring radiator, provided with a feeding point, a first grounding point and a second grounding point, wherein the feeding point is used for an electrical connection to a location determination element, and the first grounding point and the second grounding point are used for grounding respectively;

a first antenna, comprising a first radiator between the feeding point and the first grounding point;

a second antenna, configured to receive a second satellite positioning signal of a second frequency, wherein the second antenna comprises a second radiator between the first grounding point and the second grounding point;

wherein the first radiator is electrically coupled to the feeding point; and the second radiator is electrically coupled to the feeding point, wherein the feeding point, the first grounding point and the second grounding point are sequentially arranged at intervals on the ring radiator, and wherein the first antenna is configured to receive a first satellite positioning signal of a first frequency, and a half-wave slot mode of the second radiator between the first grounding point and the second grounding point is excited by the feeding point and a traveling wave mode of the first radiator between the feeding point and the first grounding point, to allow the second antenna to receive the second satellite positioning signal of the second frequency; and wherein the location determination element is electrically coupled to the first antenna and the second antenna, respectively, and is configured to receive the first satellite positioning signal and the second satellite positioning signal and determine a current geographic location according to the first satellite positioning signal and the second satellite positioning signal.

17. The wearable electronic device according to claim 16, wherein the feeding point, the first grounding point and the second grounding point are sequentially arranged at intervals in a counterclockwise direction along a circumference of the ring radiator.

18. The wearable electronic device according to claim 16, wherein the feeding point, the first grounding point and the second grounding point are sequentially arranged at intervals in a clockwise direction along a circumference of the ring radiator.

* * * * *